March 25, 1969 R. DÖRWALD 3,435,128
REPLACEABLE VACUUM-TIGHT CURRENT FEEDTHROUGHS
Filed March 23, 1966
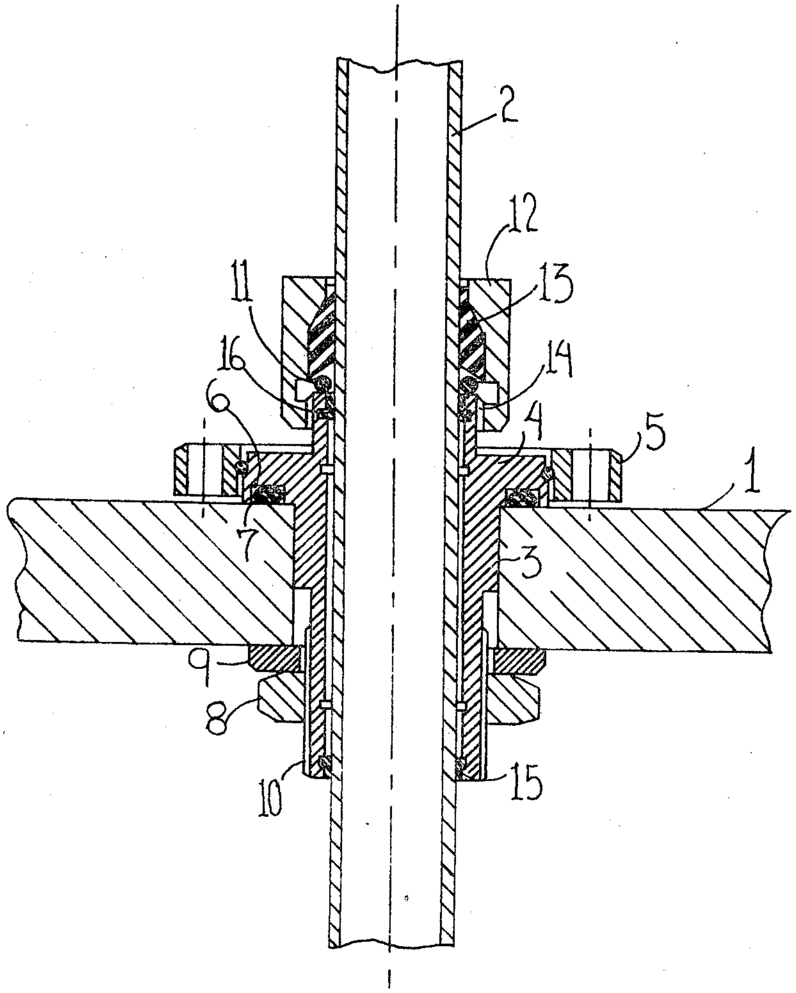
Rudolf Dörwald
INVENTOR.
BY
W S Thompson

United States Patent Office 3,435,128

Patented Mar. 25, 1969

3,435,128

REPLACEABLE VACUUM-TIGHT CURRENT FEEDTHROUGHS

Rudolf Dörwald, Triesen, Liechtenstein, assignor, by mesne assignments, to The Bendix Corporation, Detroit, Mich., a corporation of Delaware Filed Mar. 23, 1966, Ser. No. 536,837

Claims priority, application Switzerland, July 16, 1965, 10,180/65, Patent 428,881

Int. Cl. H01b *17/26;* H05k *5/02*

U.S. Cl. 174—151 6 Claims

ABSTRACT OF THE DISCLOSURE

Current feedthroughs for vacuum systems capable of carrying high magnitudes of current and capable of executing rotary motion about their axes and sliding motion along their axes are disclosed. Current is carried by a central rod of copper, or other electricity conducting material, which is insulated from the vacuum housing as well as the rest of the feedthrough apparatus. When carrying high magnitude currents, the central conductor may be tubular so that coolant may be circulated therein.

The present invention relates to a feedthrough for electronic circuitry for vacuum equipment and, more particularly, to an electronic feedthrough for vacuum evaporation equipment which is replaceable, vacuum tight, axially slidable and rotatable about its axis. Different kinds of such vacuum feedthroughs have been known which, according to their constructions, have as their goal the transfer of rotary or sliding motion or the leading in of electrical current and potential to apparatus parts within vacuum equipment. Motion transfer has been made possible by elastic wall parts of vacuum equipment; for example, through elastic bellows, or through the employment of sealing devices such as ring or edge seals, in association with shafts or rods which serve to transfer the motion. Electrical feedthroughs in the form of fused glass seals are fragile. Furthermore, when such seals are used in conjunction with high current feedthroughs which have water cooled copper rods, these feedthroughs must be simultaneously electrically insulated. Many of the known motion or current feedthroughs are capable of being disassembled, thus they can be replaced and easily cleaned.

The present invention has as its goal the construction of a current and potential feedthrough which will satisfy all practical requirements, especially as they appear in vacuum evaporation equipment and particularly shows all possibilities of adjustments, which are necessary for the convenient and efficient use of such equipment.

In vacuum evaporation equipment, the current feedthroughs serve to supply the operating current for the evaporation boats and the possible heating apparatus for the heating of the substrates for the evaporated layers.

The currents which are to be transferred vary in order of magnitude from a few amperes up to a few thousand amperes. In addition, high voltage feedthroughs are often necessary in vacuum equipment when, for example, the object to be evaporation coated is subjected to a glow discharge for the purpose of cleaning before the vaporization. The so-called cathode sputtering to a certain degree represents a well-known special form of evaporation in which a high potential leadthrough is needed for the sputter cathode. Since the objects to be worked within evaporation and sputtering equipment as, for example, optical lenses or substrates for mirrors, possess manifold shapes and sizes, and since different layers, often according to different processes, must be introduced, the holders and the arrangement of these objects in groups must often be changed in industrial manufacture. The greatest possible movability and rearrangement of all of these parts is, therefore, an indispensable requirement for any efficient production. This holds true also for the current and potential feedthroughs of all kinds necessary and suitable for the above-mentioned processes and the present invention will satisfy these requirements.

A further problem that is encountered with the known prior art feedthroughs is the cooling. Water cooling or cooling by another flowing cooling substance is generally customary and the problems of vacuum tightness connected with it are to be solved. It is highly desirable that large amounts of heat be conducted away from all parts of the apparatus at permissible temperatures and, simultaneously, a space saving design is achieved. Accordingly, two objects of the present invention are to achieve these goals. The electrical insulation against the walls of the vacuum equipment which are normally at ground potential should also be vacuum tight and should be able to withstand all pressure and temperature variations which present themselves. Further objects of the present invention are to solve these problems in a simple and efficient manner.

The foregoing and other additional objects and advantages of the present invention will appear more fully hereafter from a consideration of the detailed description which follows, taken together with the accompanying drawing in which one embodiment of the present invention is shown. It is to be expressly understood that the drawing is shown merely for the purposes of illustration and description and it should not be construed as defining the limits of the invention.

The drawing shows a plane view of the present invention, in section, and including the wall of a vacuum vessel.

The current and potential feedthrough of the present invention is constructed to be replaceable, vacuum tight, slidable along its axis and rotatable about its axis, and is characterized in that it has a flanged conducting housing, air tight in a single feedthrough opening in the wall of a vacuum equipment for a rod serving as the current or potential conductor which, in its turn, is proposed to be carried through the conductor housing by a known sealing device.

The particular embodiment of the invention shown has a thread device on the conducting housing, a coupling nut, a conductor rod slidable in the axial direction and an elastic sealing ring. In addition, a locking element of insulating material introduced between the coupling nut and the rod simultaneously serves to compress the sealing ring and to clamp the rod; and a sealing device means between the conductor housing and the rod carried through it.

For a better understanding, an example of an embodiment of the invention will be described in detail with the accompanying drawing. A wall 1 of a vacuum vessel which may be, for example, the base plate of evaporation equipment through which the current or potential is to be led is shown. A current feedthrough rod 2 which may be, for example, a copper tube, is passed through a conductor housing 3 which has a shoulder 4 so that it can be fitted over the feedthrough opening by the spring-ring flange 5 which may be secured to the vessel. The shoulder 4 produces the necessary sealing by the combination of the ring groove 6 encompassing the O ring seal 7. A nut 8 with the supplementary washer 9 may also be used for mounting the conductor housing 3 by means of a thread 10 on the other end of the conductor housing to form a solid fastening to the base plate. Both means of fastening the conductor housing are represented in the drawing; however, in the actual carrying out of the invention, one would only use that one fastening which, in such a case, appears practical depending on which side of the base plate it is possible or desirable to loosen the connection leaving the other fastening remaining as a mere abutment or stop. While the single figure of the drawing shows a specific relation between the fastening nut 8, the flange 4, and the coupling nut 12, it should be evident to the skilled artisan that threads 14 and 10 may be made equivalent so that the user may, at his discretion, place the coupling nut 12 and O ring seal 11 on either threaded end of the connector housing 3. This allows the user to connect the housing 3 to the vessel 1 in the most expeditious manner without regard to the location of the coupling nut 12. After assemblage, the coupling nut and O ring seal 11 are merely added to the exposed end of the housing 3.

The bore of the conductor housing 3 which receives the current or potential carrying rod 2, in the present case the copper tube, carries for its sealing an O ring seal 11 which is pressed against the rod to be sealed by the coupling nut 12 with its inserted electrically-insulating pressure ring 13. The coupling nut is pulled up by means of the thread 14 on the outside of the conductor housing. The ring 15 in the groove on the inner wall of this conductor housing serves to center the rod 2 in the conductor housing and in addition for electrical insulation as the drawing shows. Similarly, the ring 16 serves for centering.

With the current feedthrough according to the invention, a rapid adjustment becomes possible through the simple loosening of the fastening nut 8 or coupling nut 12, with regard to the angle and coupling nut 12 with regard to the axial direction. The adjusted electrode can be instantly fixed in position, vacuum tight, by drawing up the nut or coupling nut. This advantage is especially important in the evaporation of thin films in order to be able to accommodate the position of the evaporation sources to the changing evaporation conditions. If the current carrying rod is constructed as a tube, as in the embodiment shown, it can be heated or cooled from its inside by a medium flowing through it and it may be formed into an electrode clamp on the side used for vacuum, such as known in the art.

I claim:

1. Movable and replaceable apparatus for conducting electrical energy through a sealed vessel comprising:

a housing having a shoulder formed thereon and a passage therethrough;

conductor means inserted within said passage;

spacing ring means in said passage for locating and electrically insulating said conductor with respect to said housing while maintaining minimum contact with said conductor;

sealing means in association with said shoulder for cooperation between said shoulder and the wall of a vessel to produce a pressure seal therebetween;

fastening means in cooperative association with said housing to secure said housing to the wall of a vessel;

said housing having a threaded portion formed adjacent one of its ends;

a coupling nut member threadedly engaging said threaded portion of said housing; and an electrically insulating pressure ring member disposed intermediate said coupling nut member and said conductor means for providing the mechanical seal between the coupling nut member and the conductor means while electrically insulating one from the other.

2. The apparatus as claimed in claim 1 wherein:

said fastening means comprise a threaded portion of said housing and locking means threadedly engaged thereon;

said threaded portion being on the end of said housing opposite said shoulder so that the wall of a vessel may be received therebetween.

3. The apparatus as claimed in claim 1 wherein:

said fastening means comprise a flange interconnected to said shoulder of said housing; and said flange is adapted to be secured to the wall of a vessel.

4. The apparatus as claimed in claim 1 including further: electrically insulating pressure sealing means intermediate said pressure ring member and said threaded portion of said housing, operative to be compacted by said pressure ring member to produce a pressure-tight seal between said conductor and said pressure ring member and between said pressure ring member and said housing.

5. Apparatus as claimed in claim 4 wherein said pressure ring member has an inclined surface adjacent said electrically insulating sealing ring to force said sealing ring into compressive engagement with said conductor means.

6. Apparatus as claimed in claim 4 wherein said conductor means is a tubular conducting material with a passage formed therein to permit the flowing of a selected coolant.

References Cited

UNITED STATES PATENTS

| | | | |
|---|---|---|---|
| 1,426,337 | 8/1922 | Sperry. | |
| 1,731,597 | 10/1929 | Spear | 174—152 X |
| 2,651,672 | 9/1953 | Ivanoff | 174—152 |
| 3,113,999 | 12/1963 | Heikkinen | 174—151 |

FOREIGN PATENTS

| | | |
|---|---|---|
| 1,237,866 | 6/1960 | France. |
| 839,957 | 5/1952 | Germany. |

OTHER REFERENCES

IBM Technical Disclosure Bulletin, vol. 2, No. 4, December 1959, p. 9.

LARAMIE E. ASKIN, *Primary Examiner.*

U.S. Cl. X.R.

174—18